UNITED STATES PATENT OFFICE.

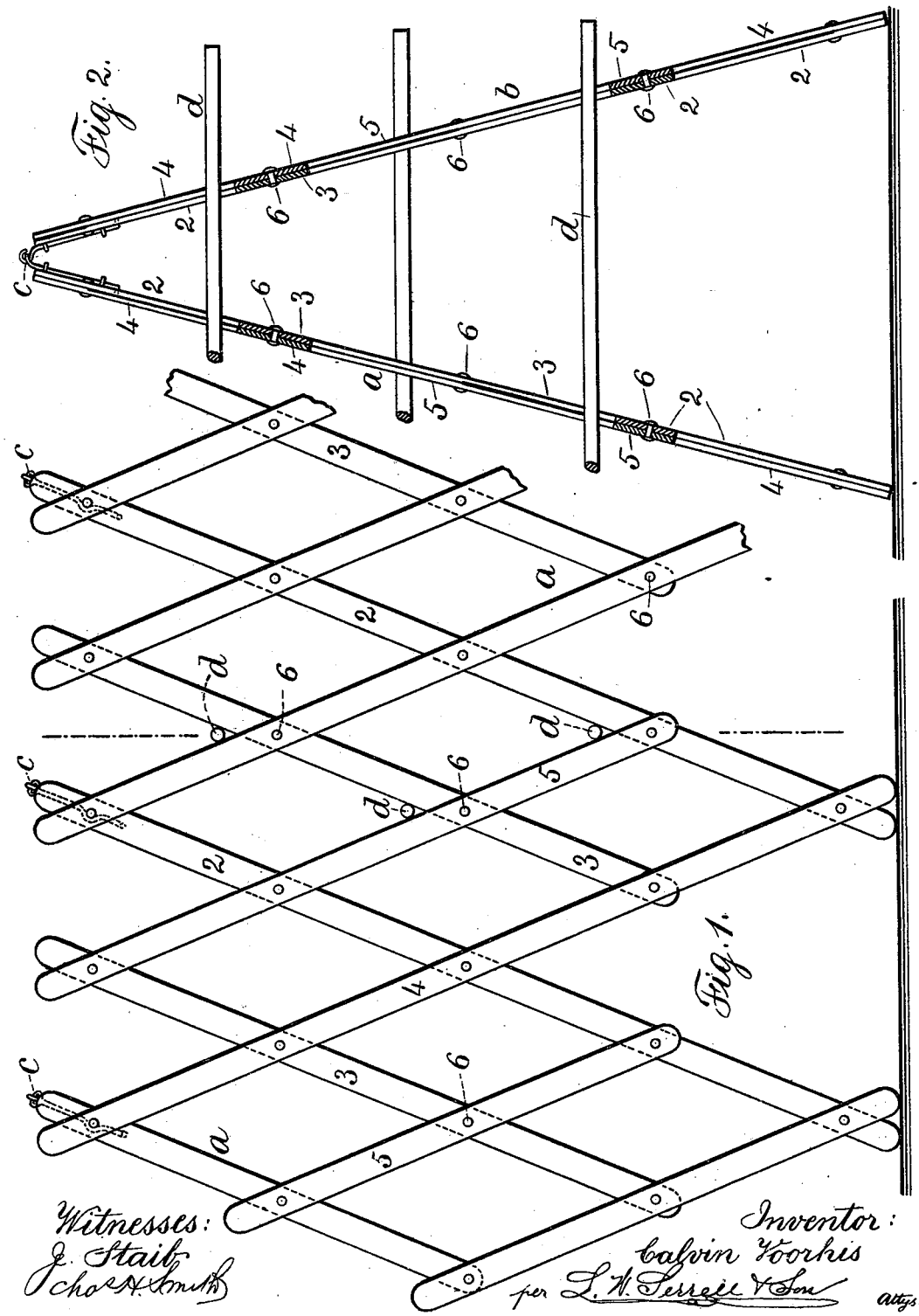

CALVIN VOORHIS, OF CRANFORD, NEW JERSEY.

TRELLIS.

SPECIFICATION forming part of Letters Patent No. 666,945, dated January 29, 1901.

Application filed August 17, 1900. Serial No. 27,142. (No model.)

*To all whom it may concern:*

Be it known that I, CALVIN VOORHIS, a citizen of the United States, residing at Cranford, in the county of Union and State of New Jersey, have invented a new and useful Improvement in Trellises, of which the following is a specification.

My invention relates to a rigid, portable, self-supporting, and extensible trellis adapted for use in connection with various growing vines—such, for instance, as tomatoes and peas—the trellis requiring no stakes or other holding devices, but simply sitting on the ground over or in proximity to the plants or vines.

In carrying out my invention I employ two similar reversed lazy-tongs sections, each composed of thin strips of material, such as wood. These sections are preferably connected at spaced-apart intervals along one edge, the sections coming together at the top and spreading at the lower ends in the form of an inverted V.

The trellis may be extended and spread for low vines or be compacted and brought more together for high vines. The sections are preferably composed of alternate short and long strips so connected that when the trellis is extended for use there are alternating open spaces at the bottom of the trellis for the introduction of cultivating-tools. I prefer to employ short transverse sticks resting in the notches formed at the junction of the strips forming the lazy-tongs section.

In the use of the device the plants or vines extend through the open spaces of the trellis and lie over the parts of the trellis, being supported thereby, and the tendrils of the plants or vines engage and cling to the parts of the trellis, thus enabling each portion of growth to receive its proper share of sunlight, air, and support.

In the drawings, Figure 1 is an elevation of the trellis at one end; and Fig. 2 is a cross-section, in partial elevation, of the same.

The trellis is composed of the two similar reversed lazy-tongs sections *a b*, each section being preferably composed (except immediately at the ends) of the long strips 2 and the alternate strips 3, running in one direction, and the overlapping long strips 4 and short strips 5, running in the opposite direction, the various strips at their points of crossing being connected by pins or rivets 6. These sections fold into compact form, in which the adjacent edges of corresponding surface-strips come together. The sections *a b* of lazy-tongs strips are preferably connected at spaced-apart intervals by hook-and-eye devices *c* at the upper ends, and these hook-and-eye devices so connect the sections that they cannot fall over onto one another. They oblige the sections to occupy an upright position wherever placed. These hook-and-eye devices are connected to the opposite inner faces of the strips composing the sections.

The structure comprising the long strips 2 4 provides alternate open spaces at the bottom of the trellis when the same is extended for the introduction of cultivating-tools into the space between the sections for the cultivation of the vines. The sections may be more or less spread, according to the character of the vines the trellis is to support, and the trellis is adapted to use from season to season until worn out. When the trellis is extended, the same covers a greater length of row of plants at a reduced height, and where the trellis is compacted and the height increased a less length of row is covered with a given trellis, it being readily understood that such a trellis would be much more extended when the same is used for tomatoes than when used for peas and that the trellis would be longer when used for tomatoes than when used for peas.

I prefer to employ in my invention with the trellis short sticks *d*, placed across through the openings of the trellis which are formed when the sections are spread, the sticks lying upon the strips forming the trellis in the notch or angle of the diverging strips, the sticks being there supported and in turn adapted to assist the trellis in supporting the vines and forming a hold for the tendrils of the vines to engage and a support for the stems of the vines, which will extend through the open spaces of the trellis and lie over the parts thereof.

The trellis is self-supporting, requiring only to rest upon the ground, and each portion of the growth of the vines receives its proper share of sunlight, air, and support. Besides the trellis, if substantially made and painted, is adapted to last for years if taken up at the close of the season and cleaned of vines and tendrils and closed up or compacted and stored away for the winter.

I claim as my invention—

1. A trellis for plants composed of two lazy-tongs sections, each consisting of alternate and oppositely-placed short and long strips pivotally connected, devices connected to the upper end of the said sections at spaced-apart intervals for removably connecting the sections, one with the other, and for holding the sections together when spread upon the ground, substantially as set forth.

2. A trellis for plants composed of two lazy-tongs sections, each consisting of alternate and oppositely-placed short and long strips pivotally connected, devices connected to the upper end of the said sections at spaced-apart intervals for removably connecting the sections one with the other, and for holding the sections together when spread upon the ground, and sticks adapted to be placed transversely of the spread-apart sections, resting in and supported by the diverging strips of the sections, in the openings formed therein, substantially as set forth.

Signed by me this 20th day of July, A. D. 1900.

CALVIN VOORHIS.

Witnesses:
ARTHUR H. SERRELL,
BERTHA M. ALLEN.